Sept. 1, 1970 W. E. KRUSE 3,526,267
PROCESS FOR COOLING SUSPENDED TiO₂ PARTICLES
Filed April 12, 1968 2 Sheets-Sheet 1

INVENTOR
WILLARD E. KRUSE

BY *Carl A. Hechmer*
ATTORNEY

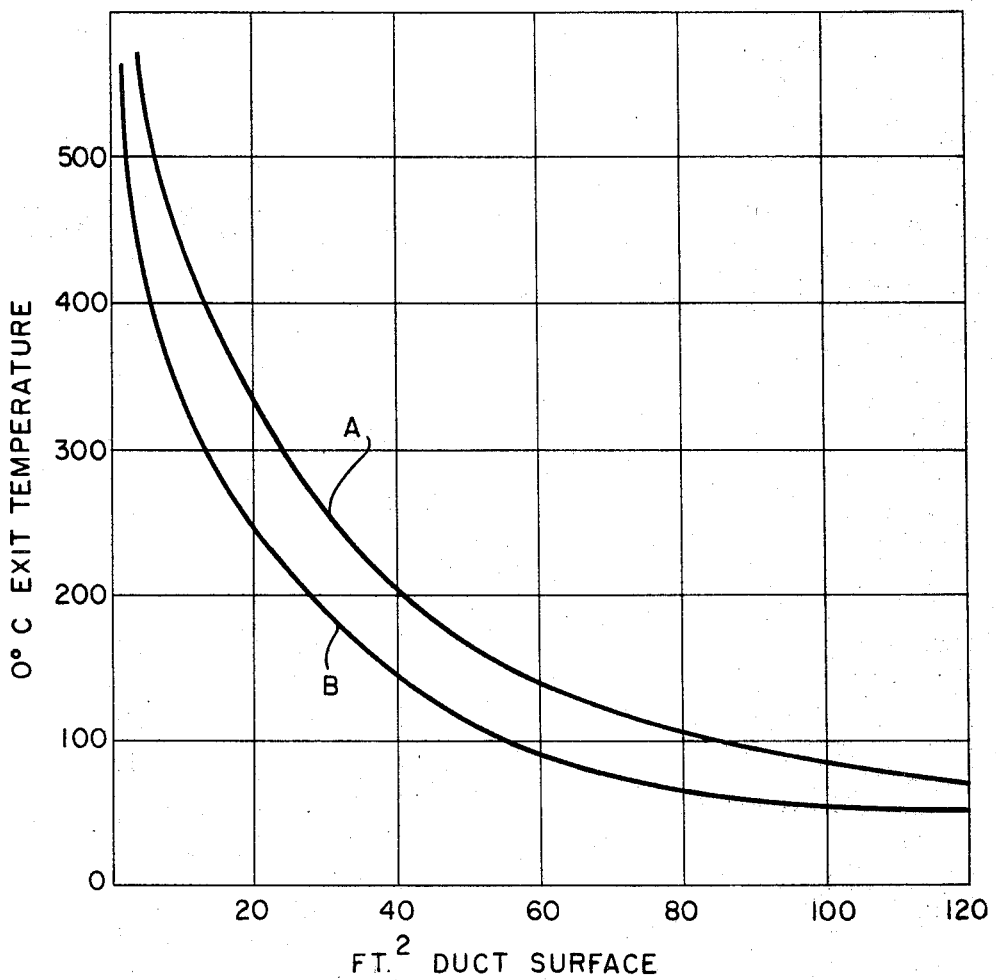

United States Patent Office 3,526,267
Patented Sept. 1, 1970

3,526,267
PROCESS FOR COOLING SUSPENDED
TiO₂ PARTICLES
Willard E. Kruse, Dickson, Tenn., assignor to E. I. du Pont de Nemours and Company, Wilmington, Del., a corporation of Delaware
Filed Apr. 12, 1968, Ser. No. 720,875
Int. Cl. F28d 11/06; F28g 7/00
U.S. Cl. 165—1                                    1 Claim

ABSTRACT OF THE DISCLOSURE

In the cooling of a hot suspension of fine titanium dioxide in a gas there is formed a layer of the titanium dioxide particles on the cooling duct wall. A vibrator is provided upstream of the cooling duct wall to loosen the deposits forming the layer so that the deposits will act as scrub solids on the downstream layer.

BACKGROUND OF THE INVENTION

In the vapor phase oxidation of $TiCl_4$ to produce $TiO_2$ pigment, the effluent from the oxidation stage contains the solid $TiO_2$ pigment suspended in off gases, at temperatures ranging from 900° C. to 1400° C. or even higher. The preferred method of cooling this mixture to temperatures of about 300° C. or lower, at which the separation of the pigment from the off gases may be practically accomplished by cyclones and filters, is to pass the hot mixture through externally cooled metal ducts. Water cooling is preferred to insure keeping the metal used below the temperature of attack by chlorine. Magnesium, aluminum and nickel are appropriate metals for the duct. A preferred type of apparatus is described in U.S. Pat. 2,833,627. In this device, the cooling ducts are surrounded by a series of water jackets so arranged that the hydrostatic pressure outside the duct is always less than the gas pressure within the duct.

In such coolers the fine pigment particles tend to accumulate in a layer on the inner duct surface. This is believed to be the cause of the loss in heat transfer observed after a rather short period of operation. A method of dislodging this layer of pigment, described in U.S. Pat. 2,721,626, consists of introducing larger scrub particles of $TiO_2$ into the hot stream where they act to scrub the duct surfaces. However, these coarse particles require an additional preparation step and add to a subsequent grinding operation. Also, when the pigment is subsequently handled, there is some difficulty with pipe stoppage due to settling of the coarse particles.

SUMMARY OF THE INVENTION

An improvement is provided in the process for cooling $TiO_2$ pigment solids and off gases produced in the vapor phase oxidation of $TiCl_4$ by vibrating the heat transfer ducts during their contact with suspended $TiO_2$ particles. Apparatus for carrying out the improved process is also provided.

BRIEF DESCRIPTION OF THE DRAWINGS

FIG. 3 are curves relating required duct surface in square feet for a given tonnage per day of $TiO_2$ (abscissa) to exit temperature (ordinate) using scrub solids (Curve A) and vibration (Curve B).

DETAILED DESCRIPTION OF THE INVENTION

Figure 1:
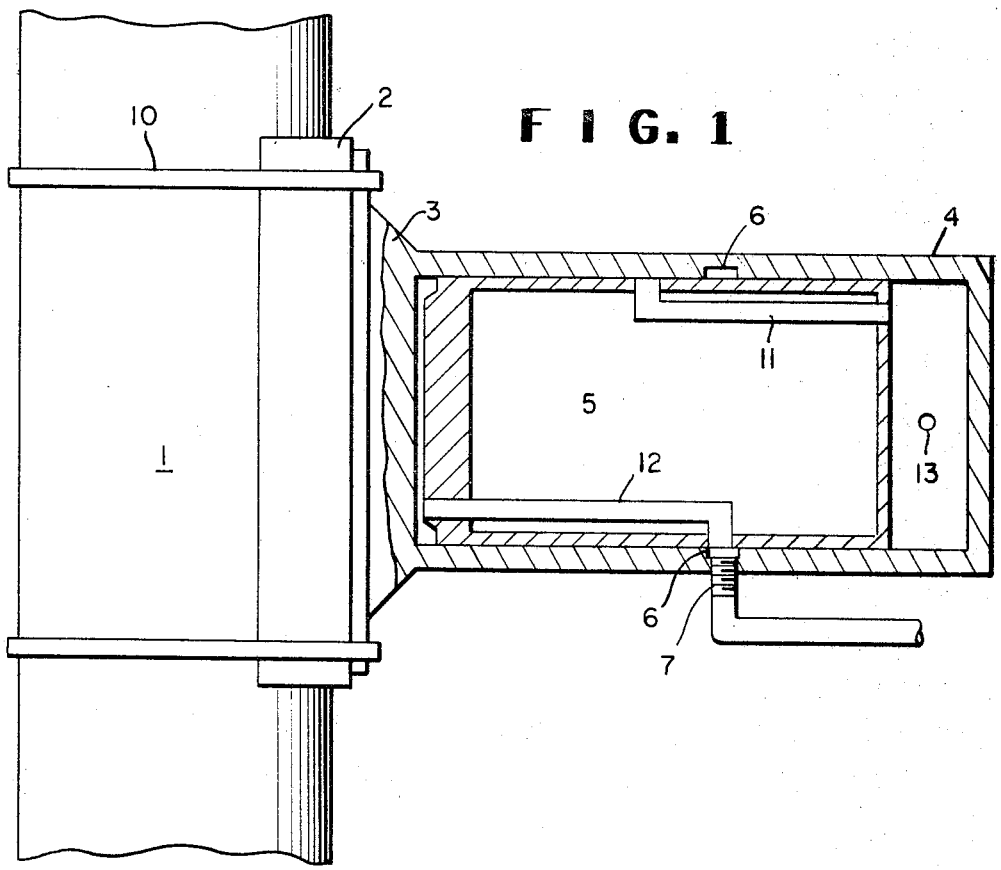
FIG. 1 is a cross-sectional view of one of the embodiments of the apparatus for vibrating the heat transfer ducts.

The apparatus of the invention can be further understood by reference to the drawings. FIG. 1 is one embodiment of the vibrating apparatus in which a saddle 2 is mounted by means of straps 10 on the duct 1 to be vibrated. A base 3 is mounted on the saddle and housing 4 is attached to base 3. Housing 4 has an inlet port 7, a peripheral slot 6 leading from above inlet port 7 to the opposite side of housing 4, and two outlet ports, 13 and the second not shown. A piston 5 having a piston port 12 for moving piston 5 to the top of its stroke and piston port 11 for moving piston 5 to the bottom of its stroke is slidably mounted in housing 4. The piston port 12 leads to one end of piston 5 and is so positioned as to align with groove 6 when piston 5 is at the bottom of its stroke; that is, against base 3. The piston port 11 leads to the opposite end of piston 5 and is so positioned as to align with peripheral slot 6 when piston 5 is at the top of its stroke.

As a continuous air flow enters inlet port 7 when piston 5 is at the bottom of its stroke, piston 5 is forced to the top of its stroke and inlet port passage 12 moves out of alignment with inlet port 7 forcing the air through peripheral slot 6, and simultaneously closing outlet port 13 causing the air to compress and form a cushion. As piston port 11 aligns with peripheral slot 6, piston 5 is reciprocated to the bottom of its stroke, striking base 3, forcing the air between base 3, and piston 5 out of the other port not shown, which is positioned near base 3 such that no cushion is provided and aligning piston port 12 with the inlet port 7. As piston 5 moves to the bottom of its stroke, outlet port 13 is uncovered and the compressed air escapes. The vibrator is now in its original state and the process is automatically repeated.

Figure 2:
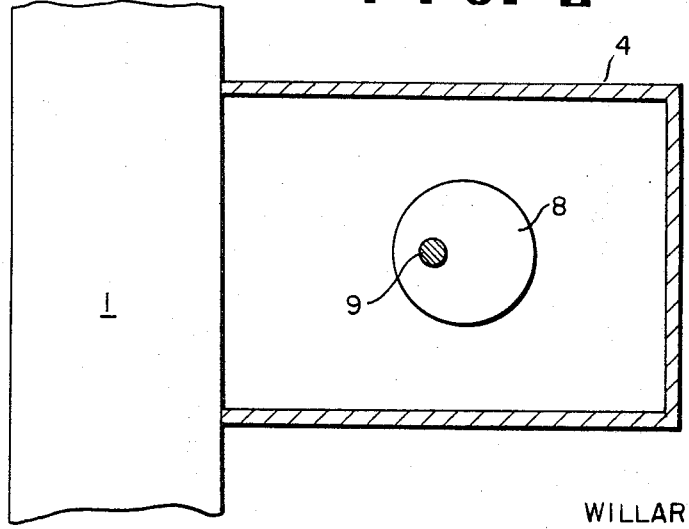
FIG. 2 is a cross-sectional view of a second embodiment of the apparatus for vibrating the ducts.

FIG. 2 is another embodiment of the vibrating apparatus in which a shaft 9 is mounted in a housing 4. A fly wheel 8 is attached to the shaft 9 in an off center position such that an unstable rotation results when the shaft 9 is rotated by a means not shown. The unstable rotation vibrates the duct 1 to which the housing 4 is attached.

Various other means for inducing vibrations of the duct walls may be used. Such known devices are electromagnetic vibrators, pneumatic and hydraulic vibrators, and other motor driven mechanical vibrators such as a vibrator which rotates a hammer-like element which delivers a series of blows to the duct. The devices may be mounted directly on the duct in any conventional manner or in close proximity to the duct or another convenient structure. Where the duct is water-cooled by emersion in a water reservoir or by water jackets, the vibrating means may be mounted on the duct itself, actually in the reservoir or on the water jacket so that the vibration is transferred through the water to the duct. Other devices which impart vibrations directly on the cooling media may be used such as reciprocating plungers, piezoelectric elements or ultrasonic transducers.

By vibrating, continuously or intermittently, the heat transfer ducts may be kept free of accumulated layers of solid without the introduction of larger, more difficultly ground particles into the process.

Other conventional means of removing deposits may be used concurrently with the vibration of the duct, if desired. For instance, scrub solids of large particle $TiO_2$ may be introduced into the duct during vibration to facilitate removal of deposits. The entire duct or portions of the duct may be vibrated. One preferred embodiment of the process of the invention is to vibrate only the up stream section of the duct whereby the material loosened serves to scrub or dislodge deposits in the down stream section.

If scrub solid $TiO_2$ particles are used, the invention reduces the amount of these scrub solids, and decreases the time required to grind the collected product, thus yielding a more economical process.

The invention also enables the use of shorter ducts by reducing the required square feet of heat transfer surface necessary to yield a given exit temperature.

FIG. 3 illustrates the relationship between the transfer surface and the desired exit temperature with and without the use of a vibrator. The data represents test runs in a large scale unit for a given daily tonnage of $TiO_2$ production. The curve A is an extrapolation of data obtained when using decreasing amounts of scrub solids in the given unit. Curve B is data obtained by the use of a vibrator alone. The advantage of a vibrator is shown by reading from the curves at a given exit temperature, the required heat transfer surface (in square feet). For instance, at an exit temperature of 200° C. the required duct surface without vibrators is 41 square feet while with vibrators, the required surface is only 28 square feet. This is about ¾ of the required surface when vibrators are not used. Furthermore, in a practical sense, the vibrators give more desirable operation in that there is no accumulation of solids on the cooling surface which would heat harden and then spall off as gritty material which must be ground to pigment size.

The following example is cited to illustrate the invention. It is not intended to limit it in any manner.

Example

A pneumatic vibrator (Cleveland Model KO, size 2, operated with 50 p.s.i.g. compressed air) is installed on the cooling duct of an installation producing $TiO_2$ pigment by the high temperature oxidation of $TiCl_4$. In this test of the invention, the vibrator is compared with the use of scrub solids. The efficiency of each is measured in terms of the temperature of the gases at the outlet of the cooling duct. At a constant load, i.e. rate of $TiO_2$ production, it is observed that when using 2% by weight of scrub solids without vibraton (control conditions) an exit temperature of 350° C. results, whereas upon activating the vibrator, the exit temperature drops to about 300° C. When the scrub solids are thereafter decreased to 1%, the temperature returns to 350° C. The use of the vibrator, therefore, increases the heat transfer in this instance to the extent that half the scrub solids can be eliminated, thereby effecting a saving in both the cost of making the scrub solids and in grinding the cooled product.

Further advantages and modifications will be apparent to one skilled in the art without departing from the concept of this invention.

I claim:

1. In a process for cooling a hot suspension of fine titanium dioxide in a gas wherein said suspension is passed through a vibrated externally cooled heat exchange duct, the improvement comprising intermittently vibrating an upstream section of said duct whereby deposits on walls of an upstream section of said duct are intermittently loosened to act as scrub solids for removal of deposits from downstream sections of said duct walls.

References Cited

UNITED STATES PATENTS

| 2,721,626 | 10/1955 | Rick | 23—202 X |
| 3,183,967 | 5/1965 | Mettenleiter et al. | 165—84 X |
| 3,295,596 | 1/1967 | Ostrofsky et al. | 165—84 |

ROBERT A. O'LEARY, Primary Examiner

A. W. DAVIS, JR., Assistant Examiner

U.S. Cl. X.R.

23—202; 165—84, 95